United States Patent [19]
Hansen et al.

[11] Patent Number: 5,527,412
[45] Date of Patent: Jun. 18, 1996

[54] SPA APPARATUS

[75] Inventors: Borg Hansen, Long Beach; Rafael Gonzalez, Palmdale; Roc. V. Fleishman, Venice, all of Calif.

[73] Assignee: Softub, Inc., Chatsworth, Calif.

[21] Appl. No.: 336,738

[22] Filed: Nov. 7, 1994

Related U.S. Application Data

[63] Continuation-in-part of Ser. No. 157,315, Nov. 26, 1993, abandoned, which is a continuation of Ser. No. 844,744, Mar. 2, 1992, abandoned, which is a continuation of Ser. No. 565,712, Aug. 13, 1990, Pat. No. 5,092,951, which is a division of Ser. No. 345,894, May 1, 1989, Pat. No. 4,981,543, which is a continuation-in-part of Ser. No. 145,233, Jan. 19, 1988, Pat. No. 4,858,254, which is a continuation-in-part of Ser. No. 891,232, Jul. 30, 1986, Pat. No. 4,843,659.

[51] Int. Cl.$^6$ ..................................................... B32B 31/00
[52] U.S. Cl. ........................... 156/215; 156/304.1; 4/538; 4/541.1
[58] Field of Search ..................... 156/184, 186, 156/191, 192, 193, 194, 195, 213, 215, 304.1; 4/541.1, 541.2, 541.3, 541.5, 541.6, 538; 210/169

[56] References Cited

U.S. PATENT DOCUMENTS

| | | |
|---|---|---|
| 2,734,459 | 2/1956 | Zimsky . |
| 3,300,355 | 1/1967 | Adans . |
| 3,337,384 | 8/1967 | Wright . |
| 3,720,964 | 3/1973 | Thomson . |
| 3,734,811 | 5/1973 | Small et al. . |
| 3,923,573 | 12/1975 | Hay . |
| 3,943,580 | 3/1976 | Carter . |
| 3,970,210 | 7/1976 | Katsuta . |
| 4,118,814 | 10/1978 | Holtom . |
| 4,349,434 | 9/1982 | Jaworski . |
| 4,546,900 | 10/1985 | Lackey . |
| 4,564,962 | 1/1986 | Castleberry et al. . |
| 4,579,617 | 4/1986 | Oberg et al. . |
| 4,699,288 | 10/1987 | Mohan . |
| 4,843,659 | 7/1989 | Popovich et al. . |
| 4,858,254 | 8/1989 | Popovich et al. . |
| 4,981,543 | 1/1991 | Popovich et al. . |
| 5,092,951 | 3/1992 | Popovich et al. . |

FOREIGN PATENT DOCUMENTS

| | | |
|---|---|---|
| 0904763 | 8/1962 | United Kingdom . |
| 1381723 | 1/1975 | United Kingdom . |

*Primary Examiner*—James Engel
*Attorney, Agent, or Firm*—William W. Haefliger

[57] ABSTRACT

In the method of forming a spa tub, the steps that include providing a tub side wall having an inner side and an outer side, the tub having an interior to receive liquid; and providing a recess inwardly of the outer side of the tub side wall and below the top level of the side wall, to receive at least one of the following elements: edge extent of a flexible outer jacket for the side wall, the jacket extending below said recess; edge extent of a shoulder jacket that extends over the top of the side wall; edge extent of a tub top cover.

42 Claims, 6 Drawing Sheets

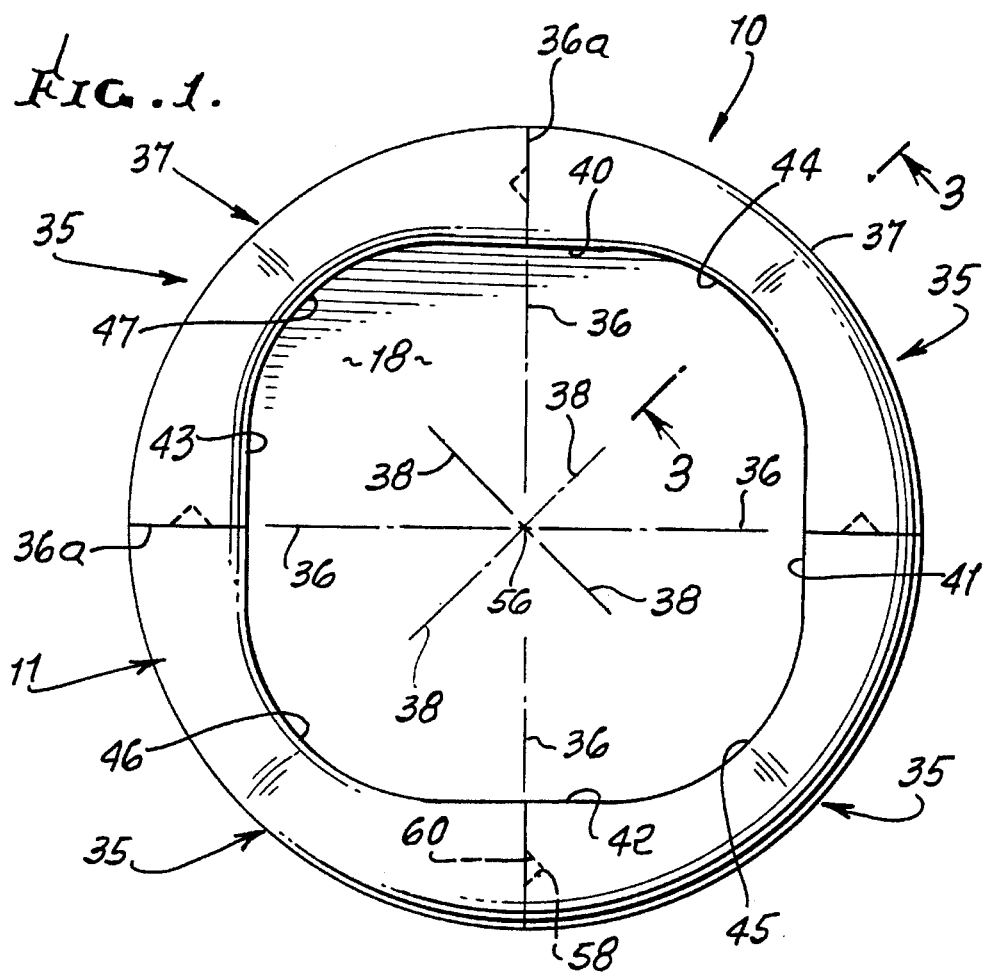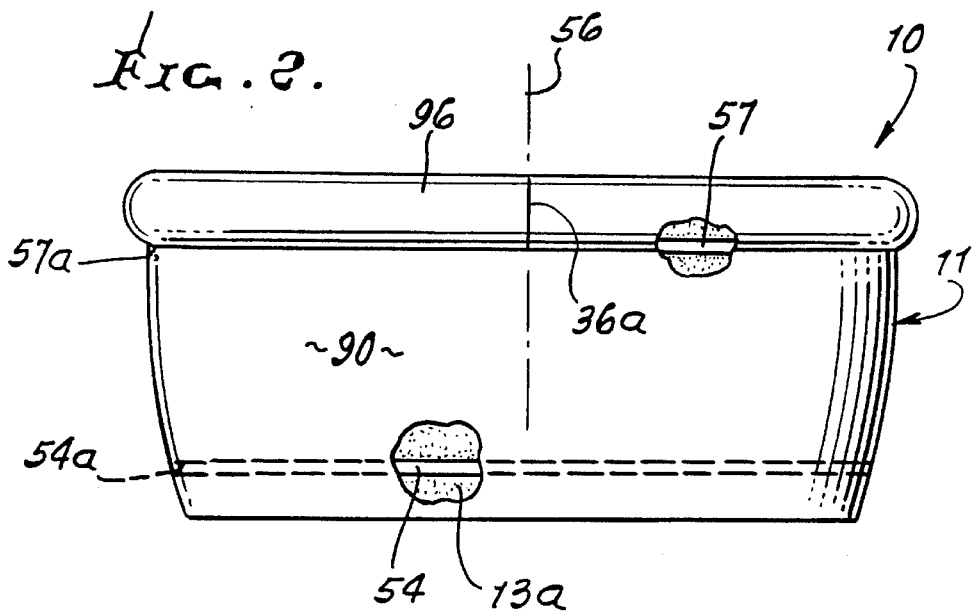

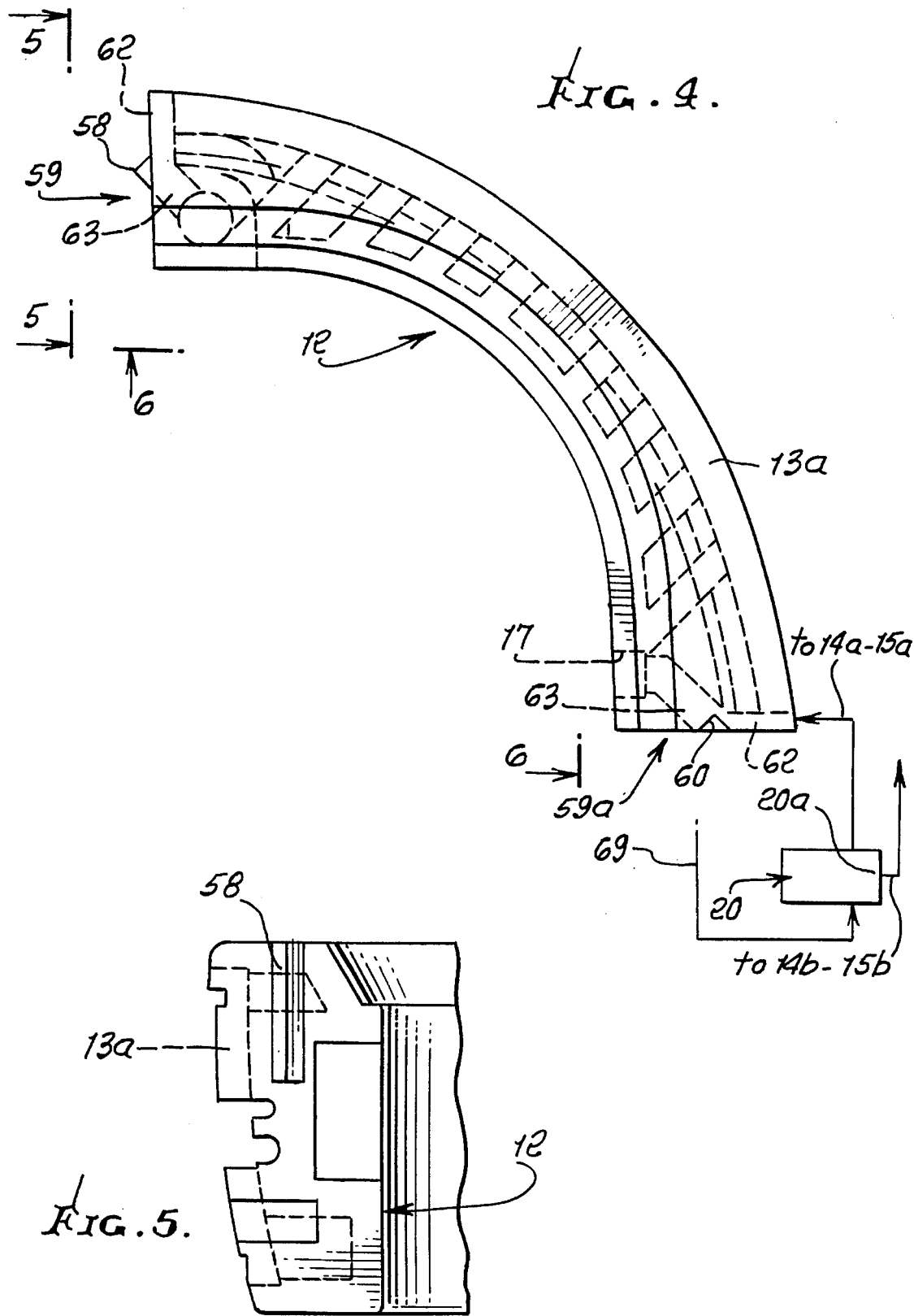

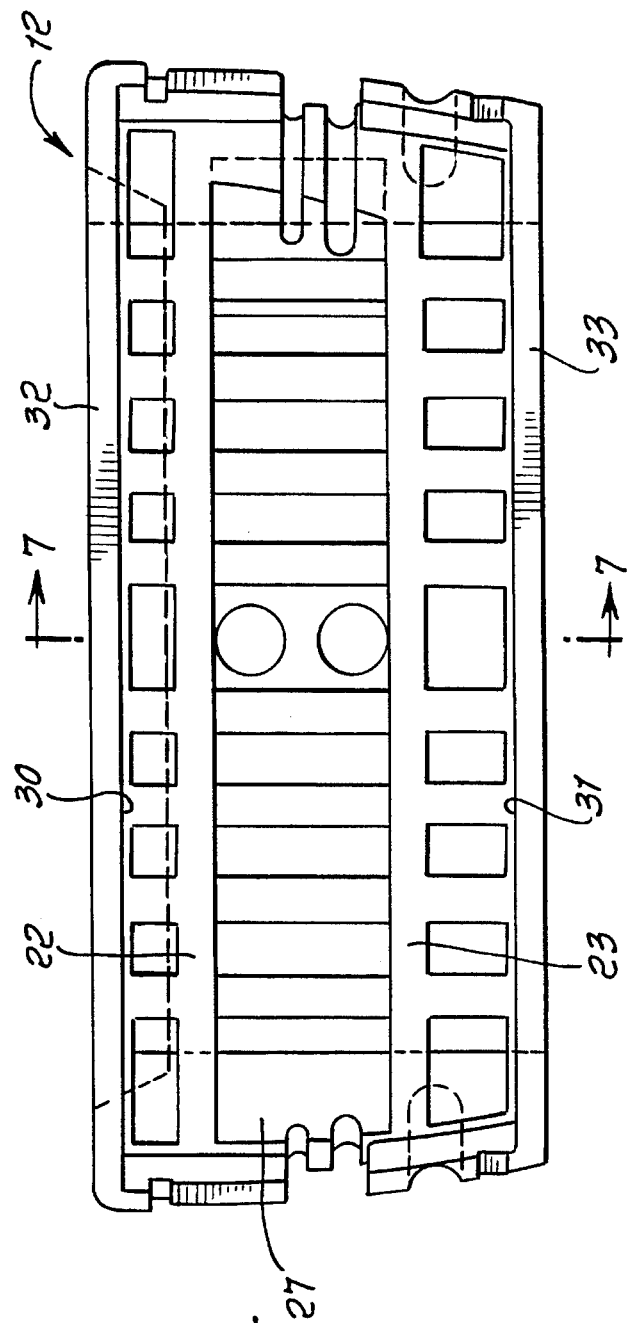
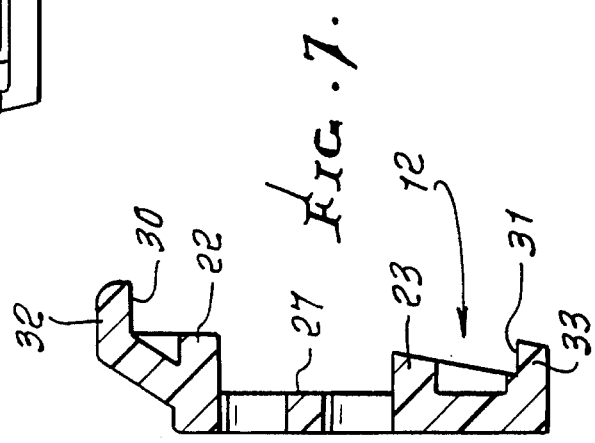

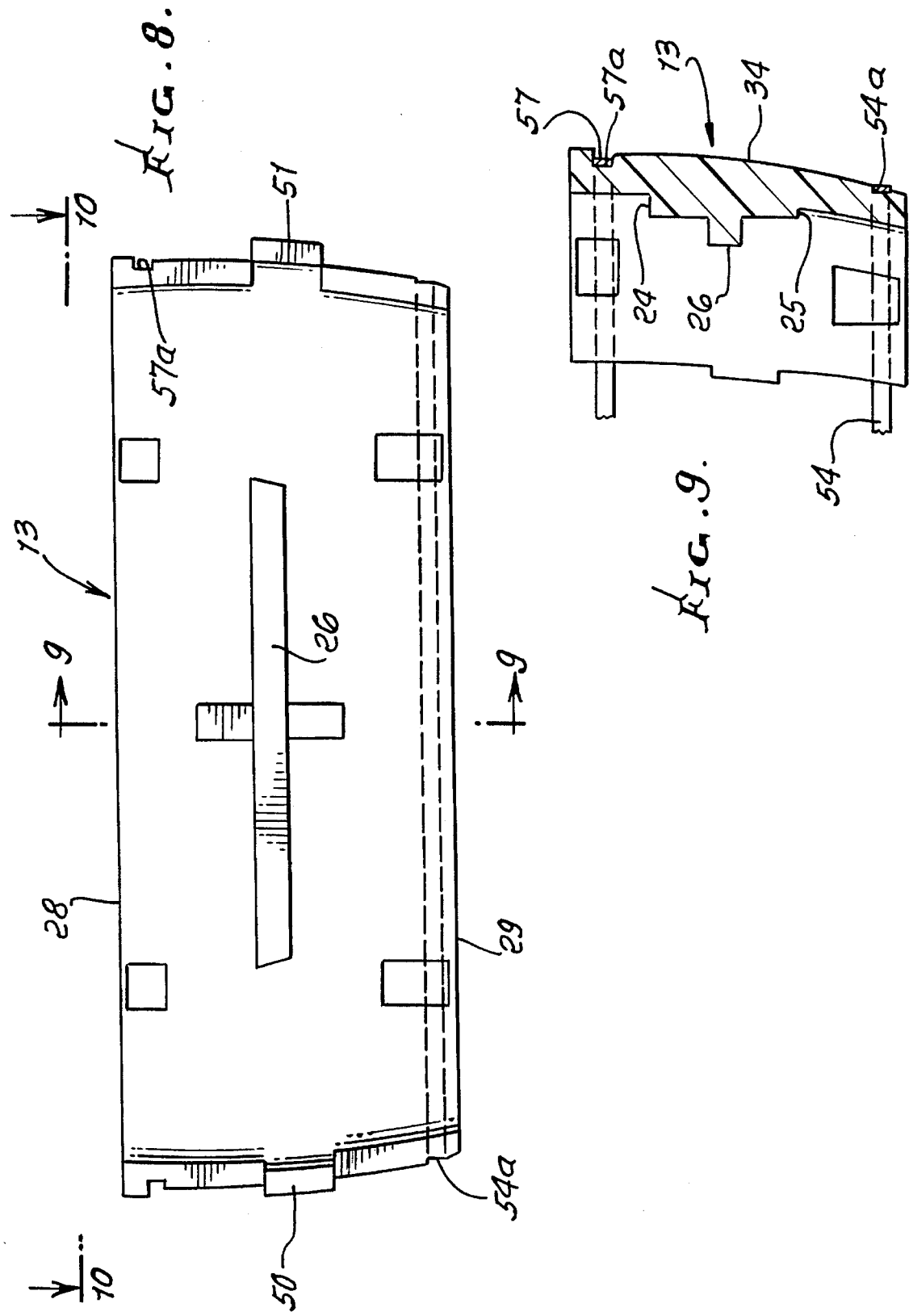

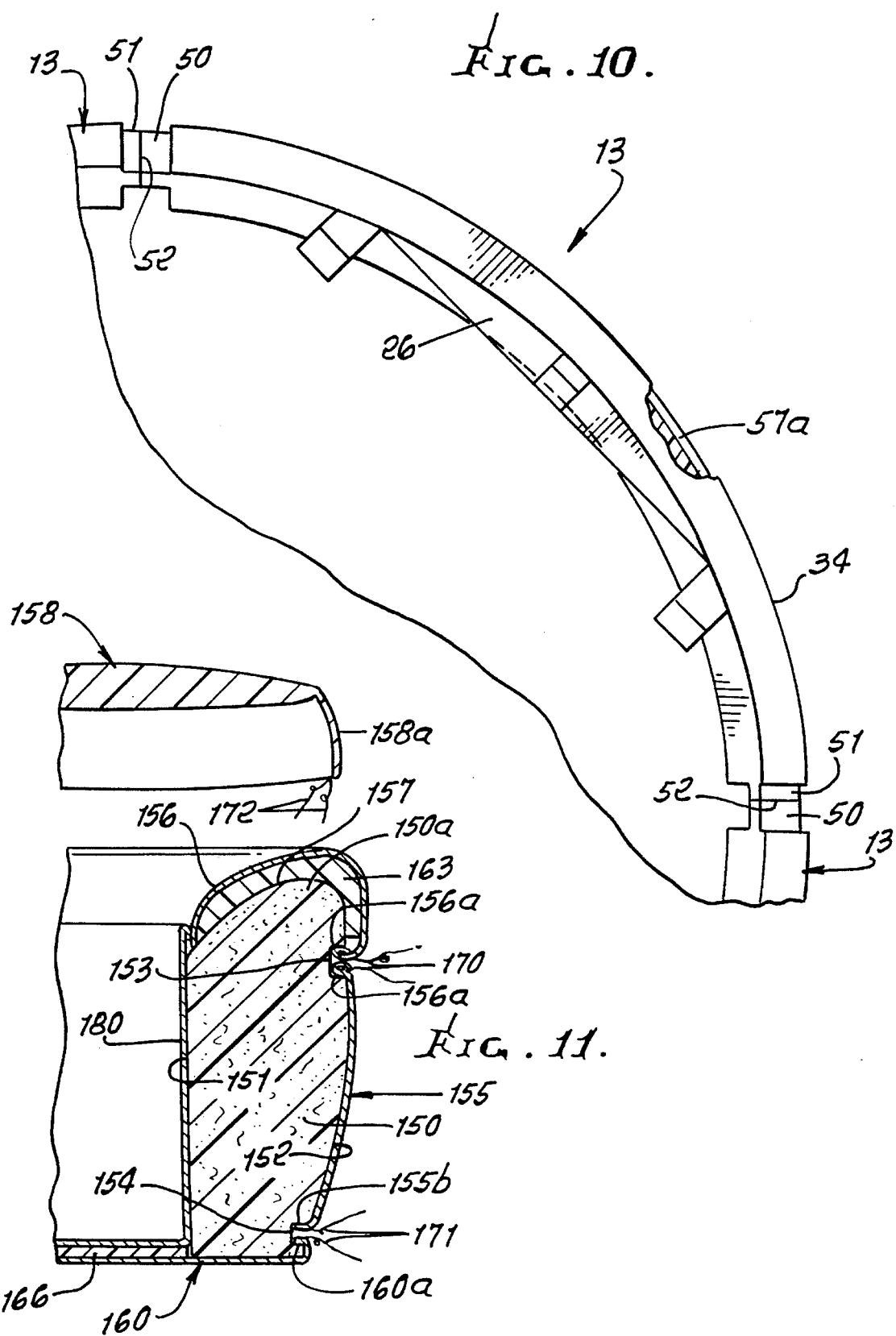

SPA APPARATUS

BACKGROUND OF THE INVENTION

This application is a continuation-in-part of Ser. No. 08/157,315, filed Nov. 26, 1993 now abandoned, which is a continuation of Ser. No. 07/844,744 filed Mar. 2, 1992, now abandoned, which is a continuation of Ser. No. 07/565,712, filed Aug. 13, 1990, now U.S. Pat. No. 5,092,951, which is a divisional of Ser. No. 07/345,894, filed May 1, 1989, now U.S. Pat. No. 4,981,543, which is a continuation-in-part of Ser. No. 07/145,233, filed Jan. 19, 1988, now U.S. Pat. No. 4,858,254, which is a continuation-in-part of Ser. No. 06/891,232 filed Jul. 30, 1986, now U.S. Pat. No. 4,843,659.

This invention relates generally to hot tubs or spas, more particularly to an easy to manufacture, low-cost, lightweight, insulated, semi-rigid plastic spa, which is easily portable.

Conventional hot tubs or spas are bulky, heavy, non-portable, and expensive in their construction; also expensive electrical energy and heat energy is required for their operation. There is need for a greatly improved, easily fabricated and assembled spa structure, with the unusual advantages in construction, modes of operation, use and transport, and results, as are now made possible by the present invention, as will appear.

SUMMARY OF THE INVENTION

It is a major object of the invention to provide a greatly improved hot tub or spa, meeting the above needs. Basically, the invention is accomplished by:

a) providing a tub side wall having an inner side and an outer side, the tub having an interior to receive liquid, b) and providing a recess inwardly of the outer side of the tub side wall and below the top level of the side wall, to receive at least one of the following elements:
  i) edge extent of a flexible outer jacket for the side wall, the jacket extending below said recess,
  ii) edge extent of a shoulder jacket that extends over the top of the side wall,
  iii) edge extent of a tub top cover.

As will appear, the recess is typically provided to extend in looping configuration.

Another object is to provide the side wall to include a cushion above the side recess, the cushion to be covered by the shoulder jacket. The cushion and shoulder jacket typically extend in a loop above the level of the side recess, and retaining means is provided in association with that recess to retain edge extents of one or more of the jackets and top cover flap, in the recess.

Yet another object includes the provision of at least two side wall sections spaced about the tub interior, each wall section incorporating a portion of the side recess, and including the step of assembling the sections to form the side wall and recess extending in looping relation, the sections consisting of synthetic resin. Four of such sections are typically employed to enable ready transport of the tub parts, before assembly, and each of the four quarter-round sections may be interconnected, as by provision of a band looping about the tub wall. Each section may be provided to have greater thickness between its inner and outer sides at each of its opposite ends than at the intermediate portion.

A further object includes providing the tub side wall, as for example each of its sections, to include an upright supporting core, and a plate attached to that core and to form therewith fluid ducting space interiorly of the side wall.

Additional objects include the provision of an outer jacket to extend proximate the tub wall outer side, and a layer of padding between that jacket and the outer side of the tub wall, below the level of the side recess; providing the tub wall to include a cushion extending at the top of the tub wall, and wherein the shoulder jacket is located to extend over the cushion; providing a liner to extend proximate the tub wall inner side and connected to said shoulder jacket, that liner extending downwardly toward the tub bottom and then beneath said tub interior; providing a tub bottom wall below the liner to support the liner; and providing a layer of padding between the liner and the tub wall inner side.

These and other objects and advantages of the invention, as well as the details of an illustrative embodiment, will be more fully understood from the following specification and drawings, in which:

DRAWING DESCRIPTION

FIG. 1 is a top plan view of a hot tub or spa incorporating the invention;

FIG. 2 is a side elevation view of the FIG. 1 hot tub or spa;

FIG. 4 is a top plan view of an inner panel as employed in FIG. 3, the tub including four such like quadrant shaped panels;

FIG. 5 is an end elevation taken on lines 5—5 of FIG. 4;

FIG. 6 is a side elevation taken on lines 6—6 of FIG. 4;

FIG. 7 is a section taken in elevation on lines 7—7, through the narrowed intermediate portion of the panel of FIG. 6;

FIG. 8 is an elevation, looking radially outwardly, at the inner side of an outer panel as employed in FIG. 3, the tub including four such like, quadrant shaped outer panels;

FIG. 9 is a vertical section taken on lines 9—9 of FIG. 8;

FIG. 10 is an enlarged, top plan view of the outer panel, taken on lines 10—10 of FIG. 8; and FIG. 11 is a vertical section through a tub wall, showing a modification.

DETAILED DESCRIPTION

Figure 3:
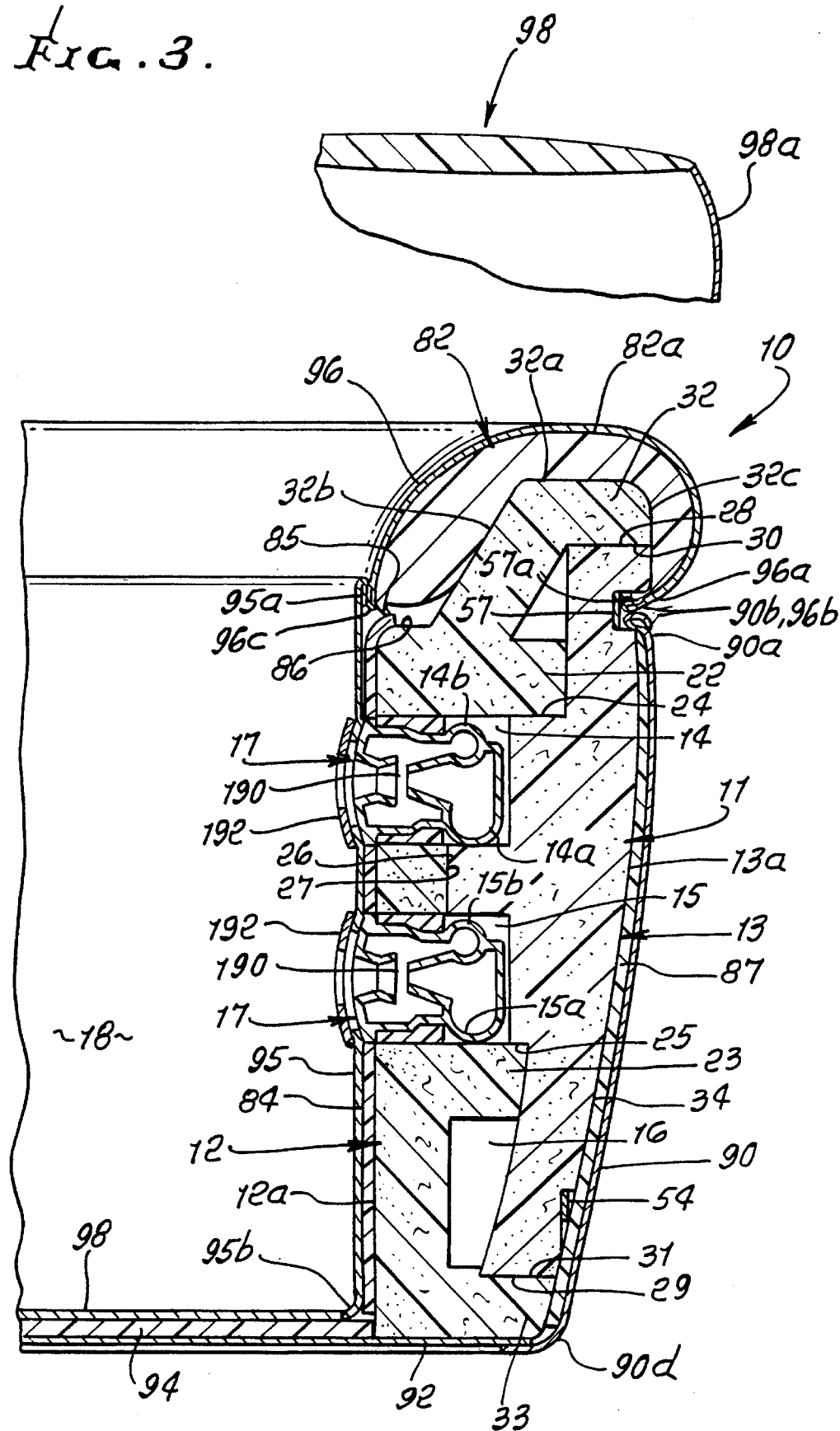
FIG. 3 is an enlarged vertical, radial section taken through the tub wall, and taken on lines 3—3 of FIG. 1.

In FIG. 1, a tub or spa 10 has a looping, upstanding, self-supporting, lightweight side wall 11. The wall includes an inner panel or panels 12, and an outer panel or panels 13, such panels typically consisting of synthetic resin. Examples are foamed or gas-expanded polystyrene and foamed or gas expanded polypropylene, formed as solid blocks that interfit as for example is shown in FIG. 3. For example, four such quadrant shaped inner panels 12 may be interconnected end-to-end in a loop, and four such substantially quadrant shaped outer panels may be interconnected with the inner panels, respectively, to define the looping tub wall, with looping space or spaces formed as at 14–16. These spaces are adapted to receive ducting, as indicated at 14a–15a, for flowing water under pressure to jet nozzles 17 that communicate through the inner panels 12 for delivery of aerated water jets to the tub interior 18 bounded by the wall 11. Air is typically supplied via lines 14b–15b for mixing at 190 with water as for example was disclosed in U.S. Pat. Nos. 4,858,254 and 4,843,659, incorporated herein by reference. Lines 14a and 14b are integrated, as are lines 15a and 15b. Jet orifice plates are shown at 192. Air is supplied to lines 14b–15b from an inlet at a warm air zone 20a in power pack 20 that include a water pump and motor drive, as disclosed in said patents. See FIG. 4.

Note that upper and lower outward protrusions 22 and 23 formed by inner panel 12 interfit recesses 24 and 25 formed by panel 13; and inward protrusion 26 formed by panel 13 fits against wall 27 formed by panel 12. Upper and lower surfaces 28 and 29 of panel 13 fit adjacent upper and lower surfaces 30 and 31 of panel 12, whereby panel 13 is received between upper and lower extents 32 and 33 of support panel 12, a unitary, two-panel, wall section being achieved. The outer side 34 of outer panel 13 may be downwardly tapered, with convexity, as shown.

As appears in FIG. 1, the four quadrant shaped wall sections 35 are alike, and assembled end-to-end, to form a looping, upstanding, self-supporting, tub wall. The end locations of the sections are located at four radial axial planes 36. Preferably, each section 35 is provided to have greater thickness between its inner and outer sides at each of the section opposite ends, indicated at 36a than at the relatively reduced thickness intermediate portion or location shown at 37. Accordingly, four such reduced thickness wall portions appear clockwise at 45°, 135°, 225° and 315° (see planes 38) and the thicker regions are located at 0°, 90°, 180° and 270° (see planes 36). The tub outer boundary is circular, as shown in FIG. 1 and its inner boundary is substantially square, with substantially straight inner sides at 40–43, and rounded corners at 44–47.

The four quadrant-shaped panels 13 have circularly projecting tongues 50 and 51 projecting at their opposite ends, as seen in FIG. 10. Tongues 50 and 51 of circularly successive outer panels have abutting engagement at loci 52, when the outer panels 13 are interlocked or otherwise connected to the inner panels 12, as referred to above. The outer panels therefore are capable of transmitting hoop compressive loading. As seen in FIGS. 8 and 9, such loading is effected as by a holding element, such as a fiberglass tape or metallic strap 54 received in lower grooves or channels 54a in the panels 13, i.e. that extend about the central axis 56 of the tub. A similar compressive load exerting holding element 57 may be received in upper channels or grooves 57a formed in the panels 13, to extend about the central axis 56. Tongues 50 and 51 fit in grooves formed by the panels 12 to form an interlock. Panel 13 fits into space 13a formed by panel 12, as seen in FIGS. 4 and 5.

A wedge shaped tongue 58 particularly at one end 59 of each inner panel 12 (see FIG. 4) interfits a groove 60 at the opposite end 59a of the inner panel, whereby the abutting ends of the quadrant shaped sections 35 are held in face-to-face alignment. Such tongues and grooves may be provided at ducting 62 and 63 formed in the outer panels, to communicate with the jet nozzles 17. Such ducting 62 and 63 is split, as shown in FIG. 4, so that one portion of each of 62 and 63 is carried at one end 59 of a panel 12, and the other portion of each of 62 and 63 is carried or provided at the other end 59a of panel 12. Abutting of the ends 59 and 59a of adjacent panels 12 forms the ducts 62 and 63. A source of fluid, such as a water pump 20, circulates water under pressure to the ducts for delivery to the jet nozzles in inner panels 13 as referred to. Return ducting 69 from the quadrant shaped section 35, re-circulates water from the tub interior to the pump unit. See for example the pump unit and circulation path, as shown in U.S. patent application Ser. No. 5,092,951.

Referring to FIG. 3, a resiliently compressible support cushion 82 is provided to seat on the upper extent 32 of the inner panel, as on its upper horizontal surface 32a, and at inclined inner surface 32b, and vertical outer surface 32c. Cushion 82 provides a comfortable arm rest, or seat for the tub user, as for example during climbing into or out of the tub. The upper surface 82a of the cushion is shown as upwardly convex, in axial radial planes, and it may extend in a complete loop in association with the tub looping upstanding wall 11. The cushion may consist of polyester batting, for example. An inner pad or cushion 84 in the form of a sheet, adjacent the inner side 12a of the panel or panels, extends from its attachment at 85 to the cushion 82, proximate ledge 86, downwardly to the bottom level of the tub. Likewise, an outer pad or cushion 87 extends downwardly in the form of a sheet, adjacent the outer side 13a of the panel or panels 13, from the level of recess 57a to the bottom level of the tub. Such cushions may be bonded to walls 12a and 13a, and may consist of expanded polyethylene foam. They are resiliently compressible.

In accordance with an important aspect of the invention, the recess 57a provided inwardly of the outer side of the tub side wall, and below its top level, is figured to receive at least one of the following elements, and preferably all of them:

i) edge extent of a flexible outer jacket for the side wall, the jacket extending below said recess, ii) edge extent of a shoulder jacket that extends over the top of the side wall, iii) edge extent of a tub top cover. The outer jacket is shown at 90 in FIG. 3, and extends adjacent or near to the outer side of the tub wall 11. Specifically it is shown as conforming closely to the shape of the outer pad 87, i.e. extending downwardly in a taper, adjacent that pad. The annular jacket 90 preferably consists of a thin sheet of marine grade polyvinyl material or similar protective outdoor fabric. The upper edge extent of the sheet is received in the recess 57a, and a drawstring 90b or other retentive means associated with that edge extent, may be tightened or tied or otherwise held in position. The lower annular edge extent 90d of the outer jacket may be attached (sewn or high frequency welded) to a bottom sheet 92 protectively underlying the bottom panel or wall 94 of the tub. Accordingly, the jacket 90 has multiple functions; i.e. it protectively covers the outer side of the tub side wall; it retains the tub bottom wall or panel 94 in position as shown; it protectively covers the outer padding 87; and it is retained to the tub via retention at recess 57a as referred to.

In similar manner, the inner liner 95 seen in FIG. 3 extends adjacent or near to the inner side of the tub wall 11. Specifically, it is shown as conforming closely to the shape of the inner pad 84, i.e. extending downwardly and cylindrically, adjacent the pad. The liner 95 preferably consists of a thin sheet of waterproof, flexible polyvinyl material, or similar waterproof, flexible sheet. Upper edge extent 95a of the sheet is attached to the inner lower edge portion 96c of a shoulder jacket 96, forming an annular bead at 97. The lower edge extent 95b of liner sheet 95 meets and is bonded to (RF weld or heat weld) the bottom vinyl sheet 98 protectively (and waterproof) overlying the bottom panel or wall 94 of the tub.

The shoulder jacket 96 is preferably of marine grade (flexible) polyvinyl chloride upholstery material or equivalent, or equivalent outdoor fabric, closely overlies the top cushion 82, conforming to its upwardly convex curvature, as shown. The outer edge extent 96a of the shoulder jacket 96 is also received in the recess 57a, and a drawstring 96b, or other retainer means associated with edge extent 96a may be tightened or tied to hold the edge 96a in position, in the recess. Accordingly, the protective jackets 90, 95 and 96 may be quickly applied to the tub, upon its assembly, and easily retained in a concealed manner to the tub.

The flexible edge extent 98a of a top cover 98 for the tub interior may also be received in the recess and retained therein by similar means, or simply tucked in that recess for retention.

From the foregoing, it will be seen that the side wall is of sufficient rigidity, to be self-supporting and able to support a bather's weight, seated on the shoulder jacket. Also, the liner 95, outer jacket and shoulder jacket are typically thin and flexible.

In the modification seen in FIG. 11, a tub side all 150 forms a loop, the wall having inner and outer sides 151 and 152. Upper and lower recesses 153 and 154 are provided inwardly of the outer side of the tub wall and below the top level 150a of that side wall. The upper recess 153 is sized to receive at least one of the following:

i) upper edge extent 155a of a flexible outer jacket 155 for the side wall, the jacket extending below said recess, ii) edge extent 156a of a shoulder jacket 156 that extends over the top 157 of the side wall, and edge extent of a tub top cover See for example cover 98 in FIG. 3.

The lower recess 154 is sized to receive at least one of the following:

iv) lower edge extent 155a of the flexible outer jacket 155 on the side wall, the jacket extending above that lower recess, and v) edge extent 160a of a bottom jacket 160 for the tub side wall 150 or the tub bottom panel.

The tub bottom panel is shown at 166. The side wall may or may not contain ducting (as in FIG. 3) to supply water, or mixed water and air, to the spa interior 162. A cushion is shown at 163, and corresponds to 82 in FIG. 3. The jackets may have the composition as referred to above in association with FIG. 3. See also inner liner 180, corresponding to liner 84.

The method of use includes installing the flexible outer jacket 155 to the outer side of said wall, with jacket edge extents 155a and 155b received in recesses 153 and 154. That jacket may have a selected color, and is easily changed as to an alternate jacket having a different color.

The method may also include installing retention means in the recesses to retain the jacket edge extents in the recesses. See for example draw strings 170–172 associated with the jackets. Other retention means may be provided.

The side wall 150 is provided to consist of lightweight synthetic resinous material and to be self-supporting, as in the side wall of FIG. 3.

We claim:

1. In the method of forming a spa tub, the steps that include a) providing a tub side wall having an inner side and an outer side, the tub having an interior to receive liquid, b) and providing a recess inwardly of the outer side of the tub side wall and below the top level of the side wall, to receive at least one of the following elements:

i) edge extent of a flexible outer jacket for the side wall, the jacket extending below said recess, ii) edge extent of a shoulder jacket that extends over the top of the side wall, iii) edge extent of a tub top cover, c) said tub side wall provided to include at least two wall sections spaced about the tub interior, each wall section incorporating a portion of said recess, and including the step of assembling said sections to form said side wall and recess to extend in looping relation, said sections consisting of synthetic resin, d) each of said sections provided to have two opposite ends, and an intermediate portion, and said assembling of the sections including interconnecting opposed ends of adjacent sections by provision of a looping retainer, e) and wherein each section is provided to have greater thickness between its inner and outer sides at each of said opposite ends than at said intermediate portion, and providing progressively increasing section thickness along the section length toward said ends, said interconnecting of the sections effective to transmit compressive loading therebetween at said ends.

2. The method of claim 1 wherein the side wall is provided to include a cushion above the recess, the cushion to be covered by the shoulder jacket, which is flexible.

3. The method of claim 2 wherein said cushion and side recess are provided to extend in a loop.

4. The method of claim 1 including providing and installing at least one of the elements i) through iii) to have said edge extent thereof received in and retained in said recess.

5. The method of claim 4 wherein said outer jacket is provided to extend proximate the tub wall outer side, and including providing a layer of padding between said jacket and the outer side of the tub wall, below the level of said recess.

6. The method of claim 4 including providing said tub wall to include a cushion extending at the top of the tub wall, and wherein said shoulder jacket is provided to extend over said cushion.

7. The method of claim 6 including providing a liner to extend proximate the tub wall inner side and connected to said shoulder jacket, said liner extending downwardly toward the tub bottom and then beneath said tub interior, and providing a tub bottom wall below the liner to support the liner.

8. The method of claim 7 including providing a layer of padding between the liner and the tub wall inner side.

9. The method of claim 1 including providing and installing at least two of the elements i) through iii) to have edge extents thereof received in and retained in said recess.

10. The method of claim 9 including providing a retention means in the recess to retain said edge extents of the two elements in the recess.

11. The method of claim 1 including providing and installing all three of said elements i) through iii) to have edge extents thereof received in and retained in said recess.

12. The method of claim 1 including providing retaining means associated with said recess to retain edge extent of at least one of the elements i) through iii) in said recess.

13. The method of claim 12 wherein said retaining means is provided in the form of one of the following:

i) band ii) tie string iii) tape iv) clamp.

14. The method of claim 12 wherein said recess and retaining means are formed to extend in looping relation.

15. The method of claim 1 wherein said tub wall is provided to include four of said wall sections.

16. The method of claim 1 wherein the outer side of each section is provided to have substantially quarter circle configuration.

17. The method of claim 16 wherein said sections are provided to consist of one of the following:

foamed polystyrene foamed polypropylene iii) foamed polyethylene.

18. The method of claim 1 wherein said tub side wall is provided to include an upright supporting inner panel, and an outer panel attached to said inner panel and to form therewith fluid ducting space protected interiorly of the side wall, said panels consisting of synthetic resin.

19. The method of claim 18 including the step of installing ducting to extend in said protected space and to communicate with the tub interior.

20. The method of claim 19 wherein said ducting is provided to include water ducting and air ducting.

21. The method of claim 1 which includes:
   f) each section provided to include an upright inner panel and an outer panel, the tub side wall being defined by said sections provided to anchor said upright supporting inner panels located in a non-circular configuration to contain liquid, and upright outer panels with exterior surfaces defining a body of revolution,
   g) said inner and outer panels forming an interior space of variable thickness, and having interfit to transmit loading from the inner panels to the outer panels.

22. In the method of forming a spa tub, the steps that include
   a) providing a tub side wall having an inner side and an outer side, the tub having an interior to receive liquid,
   b) the tub side wall provided to include at least two wall sections, spaced about said interior, and including the step of assembling said sections to form said side wall to extend in a loop, said sections consisting of synthetic resin,
   c) each section provided to have opposite ends, and providing progressively increasing section thickness along the length of each section and toward said ends, for transmitting compressive loading between adjacent section ends of increased thickness.

23. The method of claim 22 wherein said tub wall is provided to include four of said wall sections.

24. The method of claim 23 wherein each of said sections is provided to have two opposite ends, and an intermediate portion, and said assembling of the sections includes interconnecting opposed ends of adjacent sections.

25. The method of claim 24 wherein each section is provided to have greater thickness between its inner and outer sides at each of said opposite ends than at said intermediate portion.

26. The method of claim 25 wherein the outer side of each section is provided to have quarter circle configuration.

27. The method of claim 26 wherein said sections are provided to consist of one of the following:
   i) foamed polystyrene
   ii) foamed polyethylene
   iii) foamed polypropylene.

28. The method of claim 26 wherein said sections are provided to consist of molded closed cell synthetic resin.

29. The method of claim 22 wherein said tub side wall is provided to include an upright supporting inner panel, and an outer panel attached to said inner panel and to form therewith fluid ducting space interiorly of the side wall.

30. The method of claim 29 including the step of installing ducting to extend in said space and to communicate with the tub interior.

31. The method of claim 30 wherein said ducting is provided to include water ducting and air ducting.

32. The method of claim 31 including providing a water pump and a motor to drive the pump, and a housing having an interior for said motor and pump, the pump connected to deliver water to said water ducting, the air ducting connected to said housing interior wherein air is warmed by operation of said motor, for subsequent flow to mix with water from the water ducting.

33. In the method of forming a spa tub, the steps that include:
   a) providing a tub side wall that comprises a series of wall sections interconnected to form a loop about an interior to receive water,
   b) at least one section provided to include an inner panel relatively closer to said interior and an outer panel relatively further from the tub interior,
   c) and forming one of said panels of said one section to have thickness that increases in the direction of the loop, about said interior, and toward an end of the section that is proximate the next in sequence section, and transmitting loopwise compressions loading through said section end,
   d) said inner and outer panels formed to provide multiple pairs of interfitting shoulders that are presented upwardly and downwardly so that the panels have portions that overlap vertically, the panels of said one section forming a cavity therebetween to contain water ducting.

34. The method of claim 33 wherein said one panel has opposite ends and an intermediate portion, and is formed to be thicker at said opposite ends than at said intermediate portion.

35. The method of claim 34 wherein the inner panel is formed to have opposite ends and an intermediate portion, and is formed to be thicker at said opposite ends than at said intermediate portion, whereby the tub side wall has an inner side that in outline is substantially rectangular with curved corners.

36. In the method of forming a spa tub, the steps that include:
   a) providing a tub side wall that comprises a series of wall sections interconnected to form a loop about an interior to receive water,
   b) and forming said sections to provide the tub side wall to have an inner side that in outline is substantially rectangular with curved corners,
   c) each section having opposite ends and an intermediate portion, said intermediate portions defining said curved corners, each section increasing in thickness between its said intermediate portion and its opposite ends, the tub inner side at the ends of increased thickness of adjacent sections being substantially flat.

37. In the method of forming a spa tub, the steps that include:
   a) providing a tub side wall forming a loop, the wall having inner and outer sides,
   b) and providing upper and lower recesses inwardly of the outer side of the tub wall and below the top level of the side wall, the upper recess retaining the following:
      i) edge extent of a flexible outer jacket for the side wall, the jacket extending below said recess,
      ii) edge extent of a shoulder jacket that extends over the top of the side wall,
   and the lower recess retaining the following:
      iv) edge extent of a flexible outer jacket on the side wall, the jacket extending above said lower recess,
      v) edge extent of a bottom jacket for the tub side wall,
   c) said side wall provided to comprise relatively stiff plastic sections that are interconnected, to loopwise align the upper recesses therein and to loopwise align the lower recesses therein,
   d) and providing a soft cushion supporting said shoulder jacket that extends over said top of the side wall.

38. The method of claim 37 including installing said flexible outer jacket to the outer side of said wall, with jacket edge extents received in said recesses.

39. The method of claim 38 wherein said outer jacket is provided to have a selected color.

40. The method of claim 37 including installing retention means in said recesses to retain said edge extents in said recesses.

41. The method of claim 37 wherein said side wall is provided to consist of lightweight synthetic resinous material and to be self-supporting.

42. In the method of forming a spa tub, the steps that include a) providing a tub side wall having an inner side and an outer side, the tub having an interior to receive liquid, and b) the tub side wall provided to include an upright supportive inner panel having a non-circular configuration about said interior, to contain liquid in said interior, c) the tub wall also provided to form an outer panel with an exterior surface of revolution about said interior, d) a retainer looping about said side wall, to retain the side wall in position, e) and said inner and outer panels having space therebetween of variable thickness, and having interfit to transmit loading from the inner to the outer panels, in response to liquid in-fill into said interior.

* * * * *